(12) United States Patent
Fukayama et al.

(10) Patent No.: US 8,305,513 B2
(45) Date of Patent: Nov. 6, 2012

(54) LIQUID CRYSTAL DISPLAY DEVICE

(75) Inventors: Norihisa Fukayama, Mobara (JP); Mutsumi Maehara, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/049,952

(22) Filed: Mar. 17, 2011

(65) Prior Publication Data

US 2011/0164196 A1 Jul. 7, 2011

Related U.S. Application Data

(62) Division of application No. 12/180,600, filed on Jul. 28, 2008, now Pat. No. 7,911,555.

(30) Foreign Application Priority Data

Jul. 31, 2007 (JP) .................................. 2007-199688

(51) Int. Cl.
*G02F 1/1333* (2006.01)
(52) U.S. Cl. .......................................... 349/58; 349/61

(58) Field of Classification Search .................... None
See application file for complete search history.

(56) References Cited

FOREIGN PATENT DOCUMENTS
JP 2004-093718 3/2004
JP 2005-077590 3/2005

OTHER PUBLICATIONS

Machine translated document of JP 2005-091971.*

\* cited by examiner

*Primary Examiner* — Lucy Chien
(74) *Attorney, Agent, or Firm* — Antonelli, Terry, Stout & Kraus, LLP.

(57) ABSTRACT

The present invention provides a liquid crystal display device in which a light transmitting conductive layer formed on a surface of a color filter substrate is electrically connected with a backlight lower frame using conductive rubber. One end of the conductive rubber is connected with the light transmitting conductive layer, and another end of the conductive rubber is connected with the backlight lower frame through a hole which is formed in a backlight upper frame. The liquid crystal display device of the present invention can remove static electricity charged in a surface of a display panel and, at the same time, can realize the narrowing of a picture frame and the reduction of thickness thereof.

10 Claims, 9 Drawing Sheets

LIQUID CRYSTAL DISPLAY DEVICE

CROSS-REFERENCE TO RELATED APPLICATION

This application is a divisional application of U.S. application Ser. No. 12/180,600, filed Jul. 28, 2008 now U.S. Pat. No. 7,911,555, the contents of which is incorporated herein by reference.

The present application claims priority from Japanese application JP2007-199688 filed on Jul. 31, 2007, the content of which is hereby incorporated by reference into this application.

BACKGROUND OF THE INVENTION

1. Field of the Invention

The present invention relates to a liquid crystal display device, and more particularly to a liquid crystal display device which is configured to surely discharge static electricity charged in a front surface side of a liquid crystal display panel to a ground member such as a metal frame.

2. Related Art

The liquid crystal display device is configured such that a backlight assembly, a display control circuit board and the like are combined to a liquid crystal panel and these parts are formed into an integral body using a frame. The liquid crystal panel is configured such that a first substrate, that is, a thin film transistor substrate (TFT substrate) which forms pixel circuits each constituted of a thin film transistor on a main surface thereof and a second substrate, that is, a counter substrate (CF substrate) which forms color filters and the like on a main surface thereof and constitutes an image display surface side are adhered to each other, and liquid crystal is sealed in a gap formed between these substrates.

Here, in a vertical-electric-field-type liquid crystal display device which is also referred to as a TN-type liquid crystal display device, a common electrode (counter electrode) is formed on a main surface of a counter substrate. On the other hand, an IPS-type (lateral-electric-field-type) liquid crystal display device forms no electrodes on a main surface of a counter substrate. Further, beside these liquid crystal display devices, there has been known a liquid crystal display device which forms color filters on a TFT substrate and forms no color filters on a counter substrate, and a so-called VA type liquid crystal display device. Here, for the sake of brevity, the explanation is mainly made with respect to a liquid crystal display device in which the counter substrate is formed of the CF substrate. A display region occupies a most portion of an area of the liquid crystal panel, and a drive circuit and the like are mounted or formed on an outer peripheral portion of the display region. Further, an illumination device (backlight assembly) referred to as a backlight for making an image formed within the display region clear is usually mounted on a back surface of the liquid crystal panel.

The TFT substrate and the CF substrate which constitute the liquid crystal panel respectively include an insulation plate made of glass or the like. Particularly, the TFT substrate forms electrodes for driving pixels and the like on a main surface thereof. Further, a polarizer is adhered to an outer surface of the TFT substrate. Particularly, to an outer surface of the substrate (CF substrate) on a display screen side, static electricity is charged due to the application of a drive voltage to the liquid crystal. In the so-called IPS-type liquid crystal display device, in view of a display mode thereof, it is necessary to form an electric field in the lateral direction. Accordingly, the IPS-type liquid crystal display device is configured to form electrodes on the main surface of the TFT substrate in a comb-teeth shape. No electrodes are formed on the CF substrate and hence, a ratio that an area where the electrodes are not formed within the display region of the liquid crystal panel is increased. Accordingly, particularly, in this type of liquid crystal panel, a large quantity of static electricity is charged to a surface of the polarizer on a CF substrate side and hence, a phenomenon that a display image on the liquid crystal display device is disturbed attributed to the static electricity is liable to easily occur.

Figure 14:
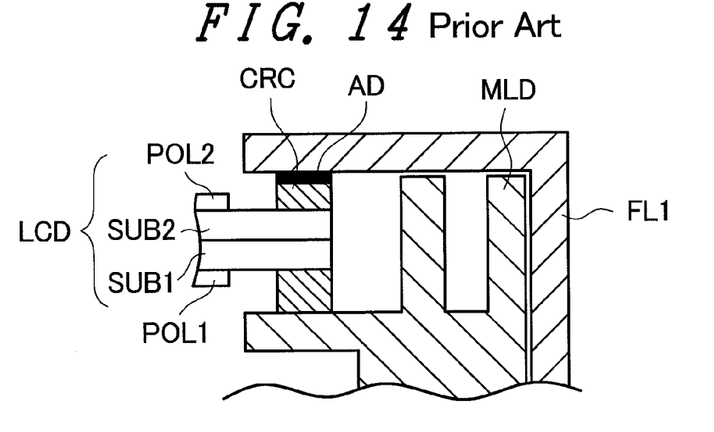
FIG. 14 is a cross-sectional view of an essential part for explaining a first example of the conventional structure for preventing a CF substrate from being charged.

FIG. 14 is a cross-sectional view of an essential part for explaining a first example of the conventional structure of the liquid crystal display device for preventing the charging of CF substrate. In FIG. 14, a liquid crystal panel LCD is constituted by adhering a TFT substrate SUB1 and a CF substrate SUB2. To an outer surface of the TFT substrate SUB1 and to an outer surface of the CF substrate SUB2, a lower polarizer POL1 and an upper polarizer POL2 are adhered respectively. A light transmitting conductive layer ITO which is preferably made of indium-tin-oxide is formed between the CF substrate SUB2 and the upper polarizer POL2.

The liquid crystal panel LCD is housed in a resin-made mold frame MLD which holds a backlight not shown in the drawing. The liquid crystal display device interposes a conductive rubber cushion CRC between the liquid crystal panel and an upper frame FL1. The upper frame FL1 is made of metal, and the upper frame FL1 and the conductive rubber cushion CRC are adhered and fixed to each other using a conductive adhesive material AD. A rubber cushion RC is interposed between the TFT substrate SUB1 and the mold frame MLD.

In this constitutional example, by interposing the conductive rubber cushion CRC and the conductive adhesive material AD between a portion of the light transmitting conductive layer ITO formed on the whole surface of the image display screen of the CF substrate SUB2 which is not covered with the upper polarizer POL2 and an inner periphery of the upper frame FL1, and by bringing the conductive rubber cushion CRC and the conductive adhesive material AD into contact with the light transmitting conductive layer ITO and the upper frame FL1 respectively, the light transmitting conductive layer ITO and the upper frame FL1 are electrically connected to each other thus discharging static electricity which is charged to the surface of the CF substrate SUB2 to a ground through the upper frame FL1.

Figure 15:
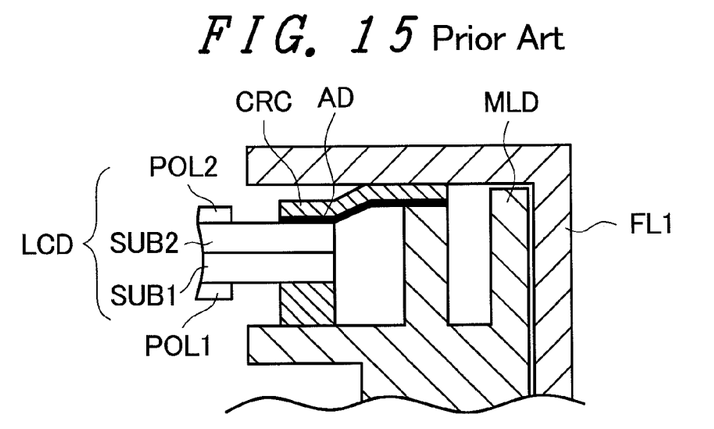
FIG. 15 is a cross-sectional view of an essential part for explaining a second example of the conventional structure for preventing a CF substrate from being charged.

FIG. 15 is a cross-sectional view of an essential part of the liquid crystal display device for explaining a second example of the conventional structure for preventing the CF substrate from being charged with the static electricity. In the same manner as the example 1, the liquid crystal panel LCD is constituted of a light transmitting TFT substrate SUB1 which forms a plurality of drive-use thin film transistors and the like not shown in the drawing on a main surface thereof, a light transmitting CF substrate SUB2 which forms color filters and the like on a main surface thereof, and a liquid crystal sealed in a gap formed between the light transmitting TFT substrate SUB1 and the light transmitting CF substrate SUB2.

A light transmitting conductive layer ITO is formed on the substantially whole surface of the CF substrate SUB2. To most of a light transmitting conductive layer ITO except for a peripheral portion of the light transmitting conductive layer ITO, an upper polarizer POL2 is adhered. In the same manner as the upper polarizer POL2, to an outer surface of a TFT substrate SUB1, a lower polarizer POL1 is adhered. A liquid crystal panel LCD is fixed to a resin-made mold frame MLD which holds a backlight using a rubber cushion RC. A conductive rubber cushion CRC is adhered to the light transmitting conductive layer ITO of the CF substrate SUB2 and the mold frame MLD using a conductive adhesive material AD. Due to such a constitution, the light transmitting conductive layer ITO of the CF substrate SUB2 is electrically connected to the upper frame FL1 made of metal.

The conductive rubber cushion CRC is formed of an approximately strip-shaped elastic body produced by mixing fine particles of a single substance of either one of a conductive material such as carbon or a metal material or fine particles of an alloy of these materials into a silicone rubber material, for example. As an example of another conductive rubber cushion CRC, there has been known a conductive rubber cushion disclosed in JP-A-2004-93718 (patent document 2). A light transmitting conductive layer ITO having a thickness of several hundreds nm is formed on the whole surface of a CF substrate SUB2 by applying alloy consisting of $IN_2O_3$ and $SnO_2$ on the whole surface of the CF substrate SUB2 by sputtering. A conductive adhesive material AD is adhered to a surface of the conductive rubber CRC which is brought into contact with the surface of the light transmitting conductive layer ITO and a surface of the conductive rubber CRC which is brought into contact with a part of a stepped portion of the mold frame MLD. Further, an upper polarizer POL2 is arranged on the light transmitting conductive layer ITO. The upper polarizer POL2 is constituted of the multi-layered structure in which a polarization layer, a reflection preventing layer and the like are stacked to each other.

Figure 16:
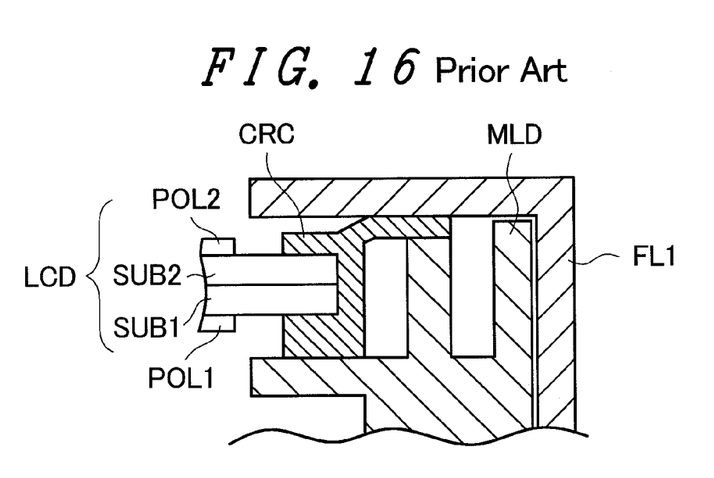
FIG. 16 is a cross-sectional view of an essential part for explaining a third example of the conventional structure for preventing a CF substrate from being charged.

FIG. 16 is a cross-sectional view of an essential part for explaining a third example of the conventional structure of the liquid crystal display device for preventing charging of the CF substrate. Parts indicated by the same symbols used in FIG. 14 and FIG. 15 correspond to identical functional parts. In FIG. 16, a conductive rubber cushion CRC is formed into an inverse U-shape in cross section having an opening portion such as a glass-protecting packing at one end thereof, and an inner surface of the opening portion is mirror-finished. Accordingly, the conductive rubber cushion CRC is hermetically adhered to the respective outer surfaces of the TFT substrate SUB1 and the CF substrate SUB2 of the liquid crystal panel LCD by vacuum suction.

In the opening portion of the conductive rubber cushion CRC, an end portion of a corner portion of the liquid crystal panel LCD is clamped by an elastic force and a vacuum suction force, while another end of the conductive rubber cushion CRC is held and fixed by an elastic force generated between a portion of the mold frame MLD and an inner surface of the upper frame FL1. Due to such a constitution, the light transmitting conductive layer ITO and the upper frame FL1 are electrically connected with each other by way of the conductive rubber cushion CRC outside the display region of the liquid crystal panel.

As documents which disclose the above-mentioned related art, JP-A-2005-77590 (patent document 1) and JP-A-2004-93718 (patent document 2) can be named.

In the above-mentioned related art, it is necessary to ensure a place where the conduction between the conductive rubber cushion and the upper frame is acquired within a predetermined space. Accordingly, it is difficult to apply the related art to a liquid crystal display device of a specification in which a picture frame of a display screen is narrow or a resin molded product having high degree of freedom in shape is not arranged below an upper frame. Further, it is difficult to apply the above-mentioned related art to a liquid crystal display device in which an upper frame is not made of a conductive material or a liquid crystal display device in which black paint or black plating is applied to an upper frame for improving appearance thus lowering conductivity of a surface of the upper frame.

SUMMARY OF THE INVENTION

Recently, there has been a demand for further narrowing of a picture frame or further decrease of thickness of the whole liquid crystal display device. As one of countermeasures to satisfy such a demand, there has been proposed a technique in which, as a frame for housing a backlight, a metal-made frame (backlight frame) is used in place of a resin-made mold frame. However, the above-mentioned conventional static-electricity prevention structure is not applicable to a liquid crystal display device which uses such a backlight frame. Accordingly, it is an object of the present invention to provide the structure which can effectively prevent the generation of static electricity in a liquid crystal panel attributed to further narrowing of a picture frame and further decrease of thickness of the whole liquid crystal display device.

To achieve the above-mentioned object, the present invention adopts the structure in which a flexible and conductive rubber cushion extends between the upper frame and a metal-made backlight frame inside of the upper frame to acquire the grounding connection.

A liquid crystal display device of the present invention includes a liquid crystal panel, a backlight assembly mounted on a back surface of the liquid crystal panel (being referred to as a backlight hereinafter), an upper frame which holds the liquid crystal panel while covering a periphery of a front surface of the liquid crystal panel and has a side wall extending toward a backlight side, and a lower frame which extends toward the liquid crystal panel side while holding the backlight from a back surface side of the backlight and has a side wall engaged with the upper frame.

The liquid crystal panel includes a first substrate which forms thin film transistors constituting pixel circuits and other circuits when necessary on a main surface (a liquid-crystal-layer-side surface) thereof, a second substrate which forms a light transmitting conductive layer on an outer surface thereof, and liquid crystal which is interposed between the first substrate and the second substrate.

The backlight includes a light source and a light guide plate. Further, the backlight is constituted of a metal-made backlight lower frame which houses the light source and the light guide plate and has a side wall extending toward a liquid crystal panel side, and a frame-shaped backlight upper frame which is arranged on a side-wall-end side of the backlight lower frame from the liquid-crystal-panel side.

An upper end portion of the backlight lower frame is arranged inside the backlight upper frame.

The backlight lower frame is electrically connected with the light transmitting conductive layer formed on the second substrate using a conductive sheet. The conductive sheet is connected with the light transmitting conductive layer and the backlight lower frame through an opening formed in the backlight upper frame.

The present invention is, not limited to the above-mentioned liquid crystal display device including such liquid crystal panel, also applicable to a display device (flat-panel display) which uses various kinds of flat-type display panel including a display screen to which static electricity is charged during operation.

According to the present invention, due to the acquisition of conduction between the side wall of the metal-made backlight lower frame and the liquid crystal panel, narrowing of a picture frame can be enhanced. Further, with the use of the flexible conductive material (for example, conductive rubber cushion), a conductive path can be installed through a narrow space having many bent portions and hence, the reliable electrical connection between the liquid crystal panel and the ground member can be realized. Further, by grounding the display screen, it is possible to realize not only the charge prevention of static electricity on the image display screen but also the suppression of radiation of leaked electromagnetic waves. Further, with the use of the flexible conductive material, an assembling operation can be facilitated thus enabling the manufacture of a product having high structural stability whereby a yield rate can be enhanced resulting in the acquisition of a highly reliable high-quality image display device.

DESCRIPTION OF THE PREFERRED EMBODIMENT

Hereinafter, preferred embodiments of the present invention are explained in detail in conjunction with attached drawings.

Embodiment 1

Figure 1:
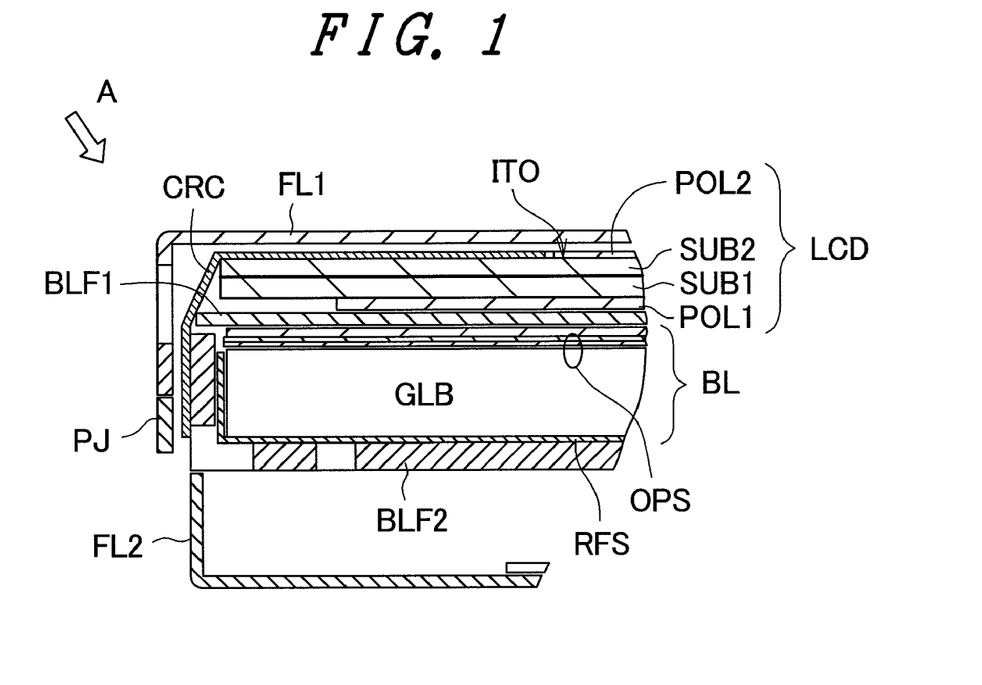
FIG. 1 is a cross-sectional view of an essential part for explaining an embodiment 1 of a liquid crystal display device of the present invention.
Figure 2:
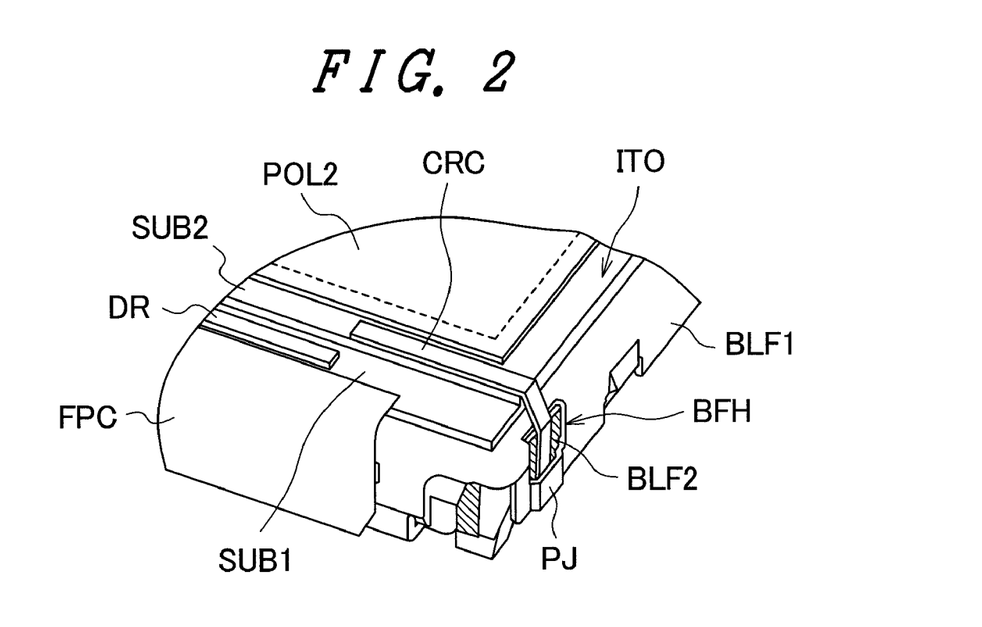
FIG. 2 is a perspective view of the essential part for explaining the embodiment 1 of the liquid crystal display device of the present invention as viewed in the direction indicated by an arrow A in FIG. 1.

FIG. 1 is a cross-sectional view of an essential part for explaining an embodiment 1 of a liquid crystal display device of the present invention. Further, FIG. 2 is a perspective view of the essential part for explaining the embodiment 1 of the liquid crystal display device of the present invention as viewed in the direction indicated by an arrow A in FIG. 1. In FIG. 2, a technical feature of the embodiment 1 is exposed by removing an upper frame shown in FIG. 1. The liquid crystal display device includes a liquid crystal panel LCD and a backlight assembly BL. The liquid crystal panel LCD is constituted of a first substrate SUB1, a second substrate SUB2 and liquid crystal sandwiched between respective main surfaces of the first and second substrates SUB1, SUB2. On the main surface of the first substrate (being referred to as a TFT substrate hereinafter), pixel electrodes and active elements such as thin film transistors (TFT) are formed, and an image display is controlled by the thin film transistors (TFT). On the other hand, on the main surface of the second substrate (being referred to as a CF substrate hereinafter), color filters are formed. Further, in the liquid crystal panel LCD, a lower polarizer POL1 and an upper polarizer POL2 are respectively adhered to outer surfaces of the TFT substrate SUB1 and the CF substrate SUB2. The backlight assembly (backlight) BL is constituted by allowing a backlight lower frame BLF2 which houses a light source and a light guide plate therein and a backlight upper frame BLF1 to overlap with each other.

The liquid crystal display device includes an upper frame FL1 which is arranged above the liquid crystal panel and has an opening at a portion thereof corresponding to a display region and a backlight BL arranged below the liquid crystal panel. Further, below the backlight BL, a display control printed circuit board, a power source printed circuit board of the backlight and the like are arranged, and these printed circuit boards are covered with the lower frame FL2.

The backlight BL is constituted of a light guide plate GLB, a light source (not shown in the drawing) arranged on at least one side surface of the light guide plate GLB, and a group of optical compensation sheets OPS formed of a prism sheet, a diffusion sheet and the like. A reflection sheet RF is arranged below the light guide plate GLB. On an outer surface of the CF substrate SUB2 of the liquid crystal panel LCD, a light transmitting conductive layer ITO is formed. The light transmitting conductive layer ITO is exposed from the upper polarizer POL2 at a portion or the whole portion of the outside (outer periphery) of the display region.

The backlight BL includes a metal-made backlight upper frame BLF1 and a metal-made backlight lower frame BLF2. A lower end portion of the backlight upper frame BLF1 and an upper end portion of the backlight lower frame BLF2 overlap with each other on a side surface of the liquid crystal panel LCD which intersects a planar surface of the liquid crystal panel LCD in a state that the backlight upper frame BLF1 overlaps with the backlight lower frame BLF2 from the outside. As shown in FIG. 2 which is a perspective view, on a surface of the CF substrate SUB2, a strip-shaped conductive sheet is formed on the light transmitting conductive layer ITO by way of a conductive adhesive material (not shown in the drawing) by adhesion. Particularly, in this embodiment, a conductive rubber cushion CRC is used as a conductive sheet, and one end side of the conductive rubber cushion CRC is connected to the light transmitting conductive layer ITO.

Another end side of the conductive rubber cushion CRC is connected to the backlight lower frame BLF2 through a hole BFH formed in the backlight upper frame BLF1 by adhesion. In the hole BFH, a portion of a side wall of the backlight upper frame BLF1 which overlaps with a side wall of the backlight lower frame BLF2 is opened and, at the same time, a bulging portion PJ is formed by bulging a portion of a lower end portion of the backlight upper frame BLF1 outwardly. The bulging portion PJ is configured to house another end side of the conductive rubber cushion CRC.

Here, on a periphery of the TFT substrate SUB1, a driver DR for driving the liquid crystal panel is mounted.

The backlight lower frame BLF2 is made of metal, and at least a surface of the backlight lower frame BLF2 is made conductive. To a back surface of the backlight lower frame BLF2, a printed circuit board for driving the liquid crystal panel LCD is fixed. The liquid crystal panel LCD and the printed circuit board use a common ground potential. The bulging portion PJ is formed on a portion of the backlight upper frame BLF1. As shown in FIG. 2, the conductive rubber cushion is sandwiched between the bulging portion PJ and the backlight lower frame. By sandwiching the conductive rubber cushion between the backlight upper frame BLF1 and the backlight lower frame BLF2, for example, even when the conductive rubber cushion floats from the backlight lower frame BLF2 due to a repulsive force thereof, provided that the conductive rubber cushion is brought into contact with either one of the backlight lower frame or the backlight upper frame, the ground connection can be ensured.

Further, with the provision of the bulging portion PJ, it is possible to easily insert the conductive rubber cushion between the backlight upper frame BLF1 and the backlight lower frame BLF2. In this case, one end of the conductive rubber cushion may be preliminarily arranged between the backlight upper frame BLF1 and the backlight lower frame BLF2 and, thereafter, the liquid crystal panel may be arranged on the backlight and another end of the conductive rubber cushion may be adhered to the liquid crystal panel. Further, after arranging the liquid crystal panel on the backlight, the liquid crystal panel and the backlight lower frame may be connected with each other using the conductive rubber cushion.

The backlight upper frame BLF1 is a frame-shaped body having an opening at a portion thereof corresponding to the display region of the liquid crystal panel, and is either a metal molded product or a plastic molded product. However, the backlight upper frame BLF1 is preferably made of metal from a viewpoint of the profile stability or the reduction of EMI (electromagnetic wave interference). There is no problem even when a surface of the backlight upper frame BLF1 is made non-conductive by applying a painting or plating to the surface.

Figure 3:
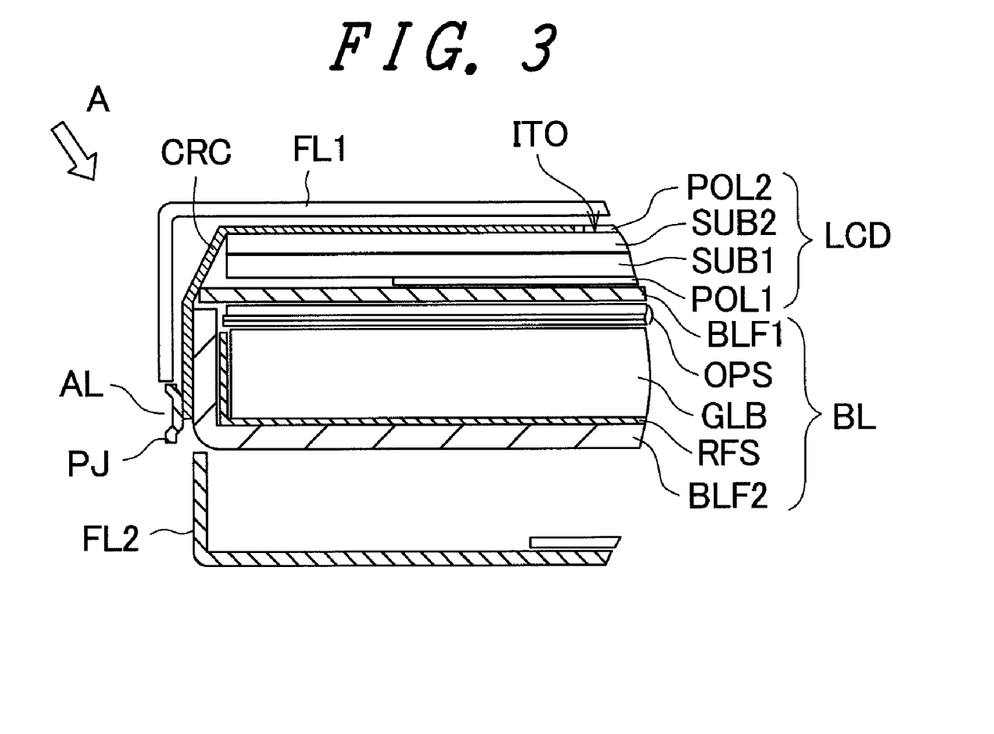
FIG. 3 is a cross-sectional view of the essential part for explaining another constitution of the embodiment 1 of the liquid crystal display device of the present invention.
Figure 4:
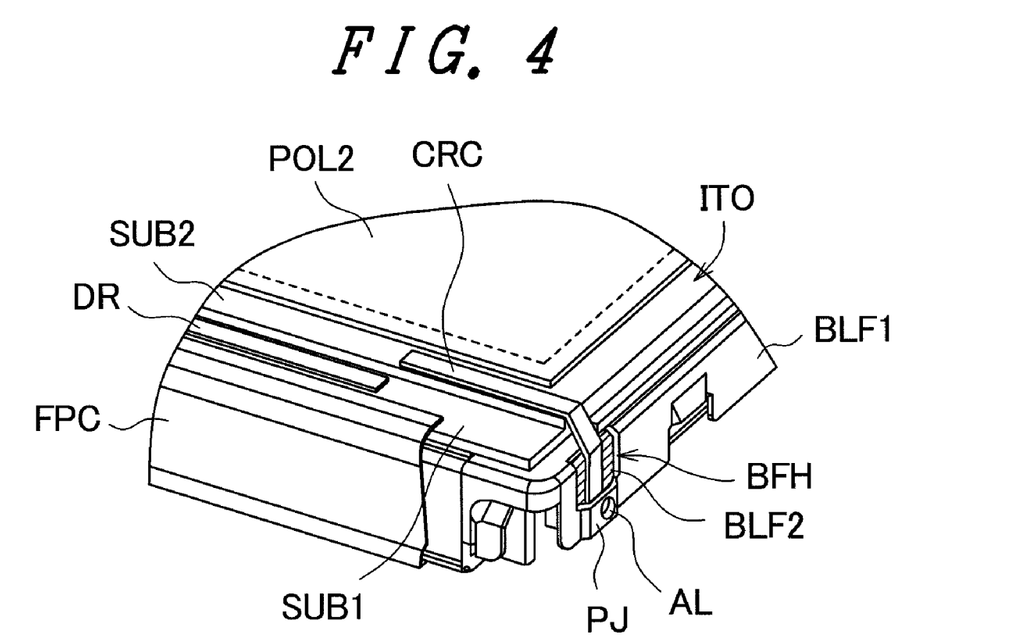
FIG. 4 is a perspective view of the essential part for explaining another constitution of the embodiment 1 of the liquid crystal display device of the present invention as viewed in the direction indicated by an arrow A in FIG. 3.

The constitution shown in FIG. 3 and FIG. 4 includes, in addition to the constitution of the embodiment 1, a projecting portion AL which is formed on the bulging portion PJ which bulges outwardly. The projecting portion AL projects inwardly (toward the backlight lower frame) and hence, the projecting portion AL is referred to as a recessed portion hereinafter. FIG. 3 is a cross-sectional view of an essential part of the liquid crystal display device, and FIG. 4 is a perspective view of the essential part of the liquid crystal display device as viewed in the direction indicated by an arrow A in FIG. 3.

In the liquid crystal display device shown in FIG. 3 and FIG. 4, the bulging portion PJ is formed by bulging a lower portion of the hole BFH formed in the backlight upper frame BLF1 outwardly. Further, a portion of the bulging portion PJ is recessed inwardly to form the recessed portion AL. Further, a corresponding portion of the backlight upper frame BLF1 may be simply depressed inwardly so as to impart an effect of pushing the conductive rubber cushion CRC toward the backlight lower frame BLF2 to the backlight upper frame BLF1. Due to such a constitution, the conductive rubber cushion can be surely sandwiched between the backlight upper frame BLF1 and the backlight lower frame BLF2 and hence, it is possible to prevent the conductive rubber cushion from floating from the backlight lower frame BLF2 due to a repulsive force.

According to the embodiment 1, it is possible to realize further narrowing of a picture frame and the reduction of thickness of the whole liquid crystal display device and, at the same time, it is possible to effectively remove static electricity charged to the liquid crystal panel with the simple structure.

Embodiment 2

Figure 5:
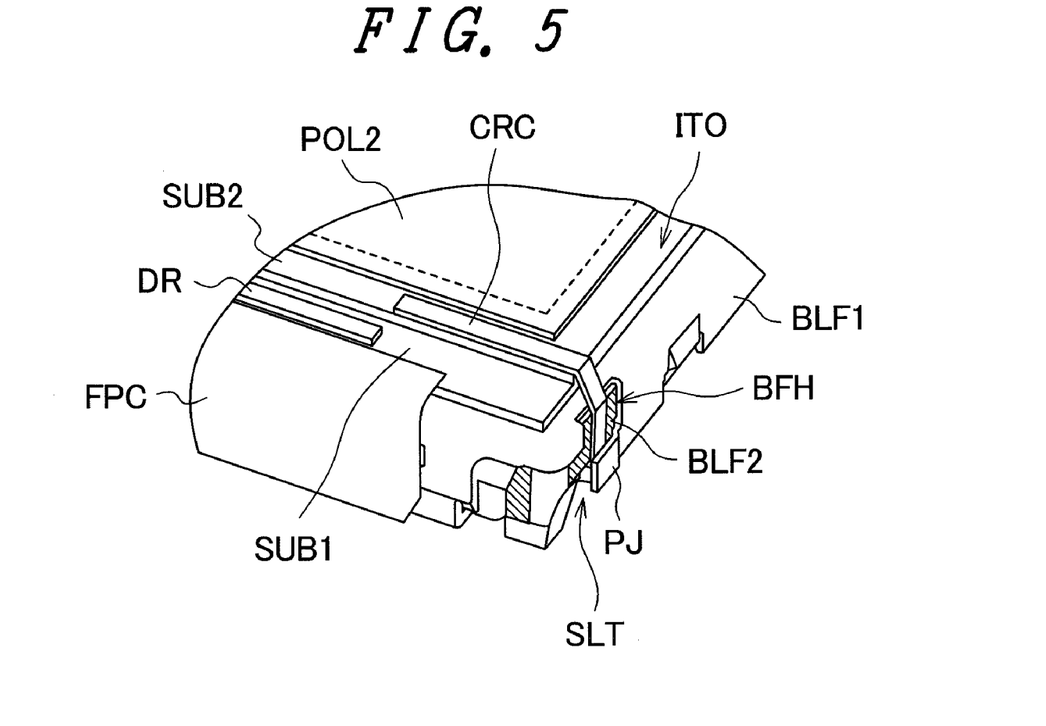
FIG. 5 is a perspective view of an essential part for explaining an embodiment 2 of the liquid crystal display device of the present invention.

FIG. 5 is a perspective view of an essential part for explaining the embodiment 2 of the liquid crystal display device according to the present invention. In the embodiment 2, one side of the bulging portion PJ (one side of the bulging portion PJ in the longitudinal direction of the conductive rubber cushion CRC) in the embodiment 1 is separated from the backlight lower frame BLF2. The constitution of other parts of this embodiment is substantially equal to the constitution of the corresponding parts of the embodiment 1 and hence, their repeated explanations are omitted. Due to such a constitution, it is possible to easily insert the conductive rubber cushion CRC between the backlight upper frame BLF1 and the backlight lower frame BLF2.

Figure 6:
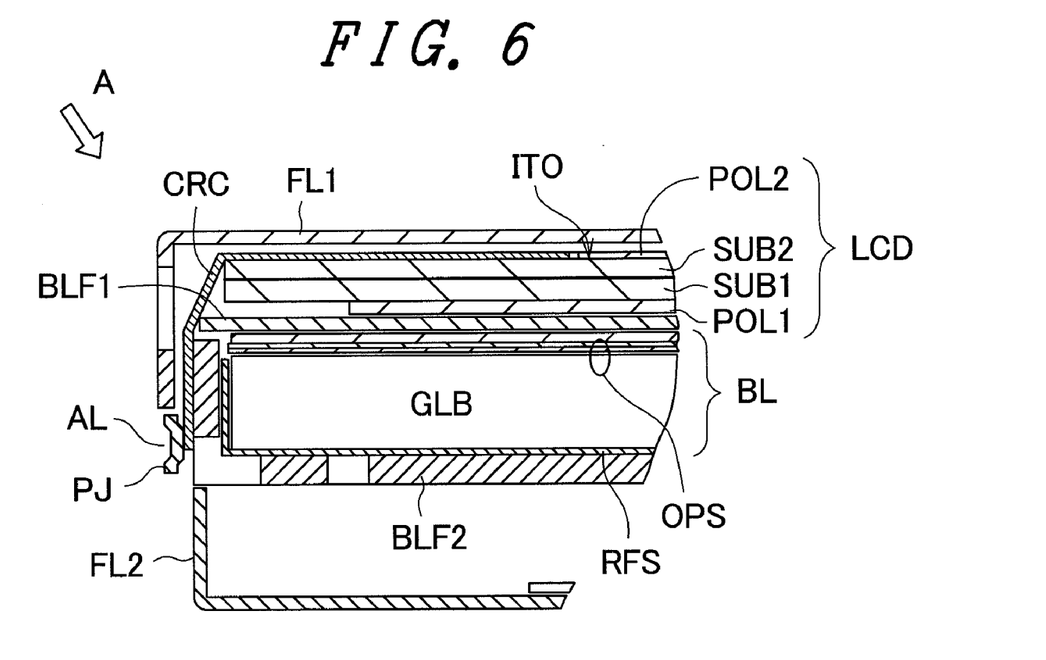
FIG. 6 is a cross-sectional view of an essential part for explaining another constitution of the embodiment 2 of the liquid crystal display device of the present invention.
Figure 7:
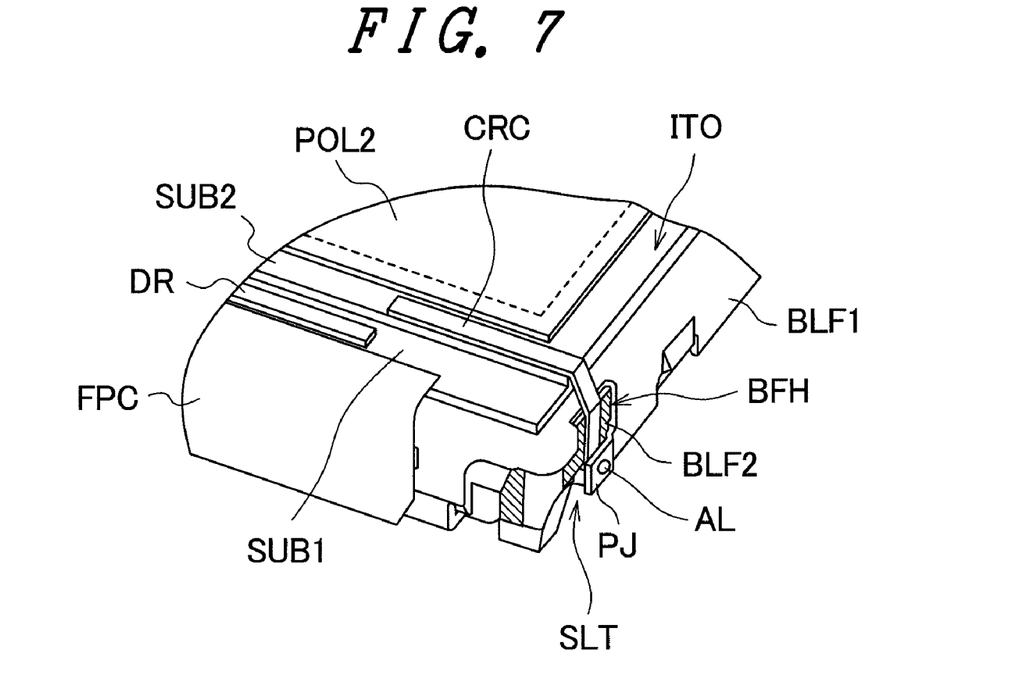
FIG. 7 is a perspective view of an essential part for explaining another constitution of the embodiment 2 of the liquid crystal display device of the present invention as viewed in the direction indicated by an arrow A in FIG. 6.

FIG. 6 is a cross-sectional view of an essential part for explaining the embodiment 2 of the liquid crystal display device according to the present invention. Further, FIG. 7 is a perspective view of the essential part for explaining the embodiment 2 of the liquid crystal display device according to the present invention as viewed in the direction indicated by an arrow A in FIG. 6. In this embodiment, another end side of the conductive rubber cushion CRC is adhered to a backlight lower frame BLF2 through a hole BFH formed in a backlight upper frame BLF1. Further, a projecting portion AL which projects inwardly (toward the backlight lower frame) is formed on a bulging portion PJ which bulges outwardly. Further, the constitution which makes this embodiment different from the embodiment 1 lies in that one side of the bulging portion PJ (one side of the bulging portion PJ in the longitudinal direction of the conductive rubber cushion CRC) is separated from the backlight lower frame BLF2.

In the embodiment 2, the bulging portion PJ is formed by projecting a lower edge portion of the backlight upper frame BLF1 outwardly, and a recessed portion AL (equal to the above-mentioned projecting portion AL) is formed by depressing a portion of the bulging portion PJ inwardly. Further, a corresponding portion of the backlight upper frame BLF1 may be simply depressed inwardly so as to impart an effect of pushing the conductive rubber cushion CRC toward the backlight lower frame BLF2 to the backlight upper frame BLF1.

Here, as shown in FIG. 7, one side of the bulging portion PJ (a portion of the bulging portion arranged parallel to one side of the conductive rubber cushion CRC in the longitudinal direction) is cut out from the backlight lower frame BLF2 so as to form a slit SLT. Due to such a constitution, the conductive rubber cushion CRC can be easily inserted into the bulging portion PJ from the widthwise direction thus facilitating the assembling of the liquid crystal display device.

Also according to the embodiment 2, it is possible to realize further narrowing of a picture frame and the further reduction of thickness of the whole liquid crystal display device and, at the same time, it is possible to effectively remove the static electricity charged to the liquid crystal panel with the simple structure.

Embodiment 3

Figure 8:
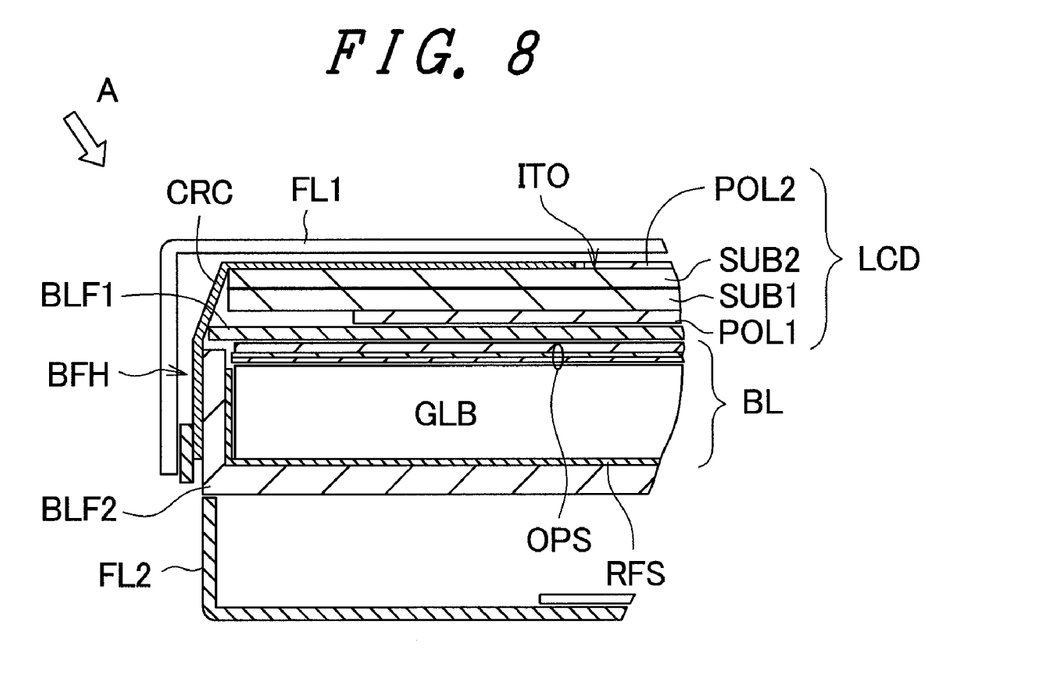
FIG. 8 is a cross-sectional view of an essential part for explaining an embodiment 3 of the liquid crystal display device of the present invention.
Figure 9:
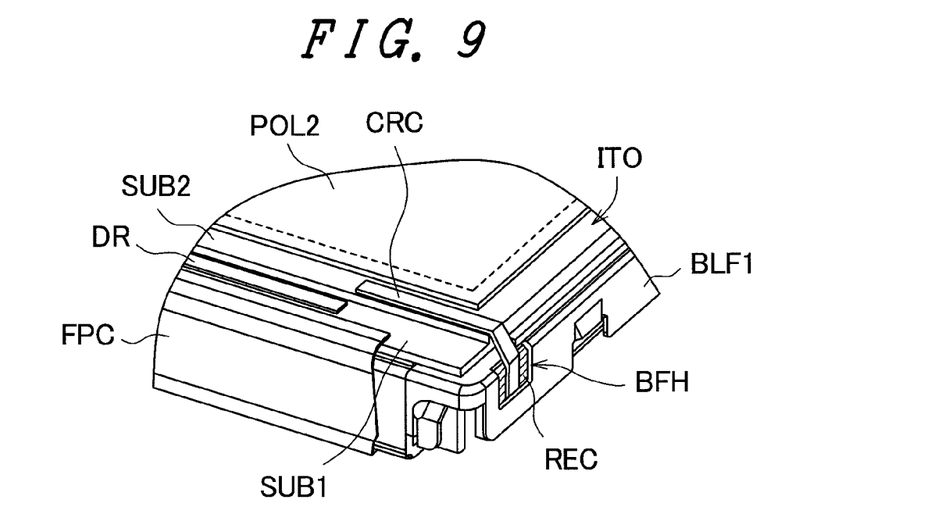
FIG. 9 is a perspective view of an essential part for explaining the embodiment 3 of the liquid crystal display device of the present invention as viewed in the direction indicated by an arrow A in FIG. 8.
Figure 10:
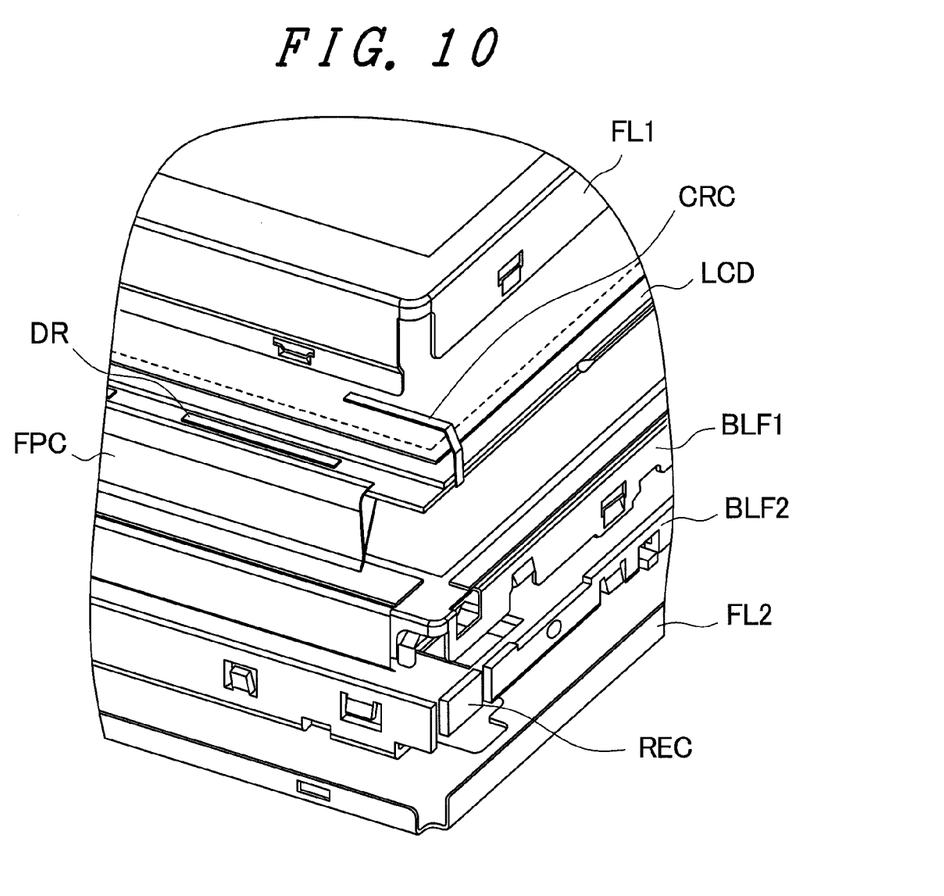
FIG. 10 is a developed view of an essential part in FIG. 9 for explaining the embodiment 3 of the liquid crystal display device of the present invention.

FIG. 8 is a cross-sectional view of an essential part for explaining the embodiment 3 of the liquid crystal display device according to the present invention. FIG. 9 is a perspective view of the essential part for explaining the embodiment 3 of the liquid crystal display device according to the present invention as viewed in the direction indicated by an arrow A in FIG. 8. Further, FIG. 10 is a developed view of the essential part of the liquid crystal display device. In these drawings, parts identical with the parts of the embodiment 1 are given same symbols.

In this embodiment, a bulging portion is not formed on a backlight upper frame, while a hole BFH which exposes a backlight lower frame to the outside is formed in the backlight upper frame.

On the other hand, a recessed portion REC is formed on a backlight lower frame BLF2.

A conductive rubber cushion CRC which extends toward a side wall of the backlight lower frame BLF2 is connected to the recessed portion REC formed on the backlight lower frame BLF2 through the hole BFH. That is, a side wall portion of the backlight lower frame forms the recessed portion on a portion thereof, and a conductive sheet is in contact with the recessed portion.

Here, the conductive rubber cushion CRC is adhered to the backlight lower frame BLF2 using a conductive adhesive material. Further, the conductive rubber cushion is sandwiched between the backlight upper frame and the backlight lower frame. That is, the conductive rubber cushion is brought into contact with both an outer surface of the side wall of the backlight lower frame BLF2 and an inner surface of the side wall of the backlight upper frame BLF1.

Due to such a constitution, the conductive rubber cushion can be surely connected to the backlight upper frame BLF1 and the backlight lower frame BLF2.

Also according to the embodiment 3, it is possible to realize the further narrowing of a picture frame and the further reduction of thickness of the whole liquid crystal display device and, at the same time, it is possible to effectively remove the static electricity charged to the liquid crystal panel with the simple structure.

Figure 11:
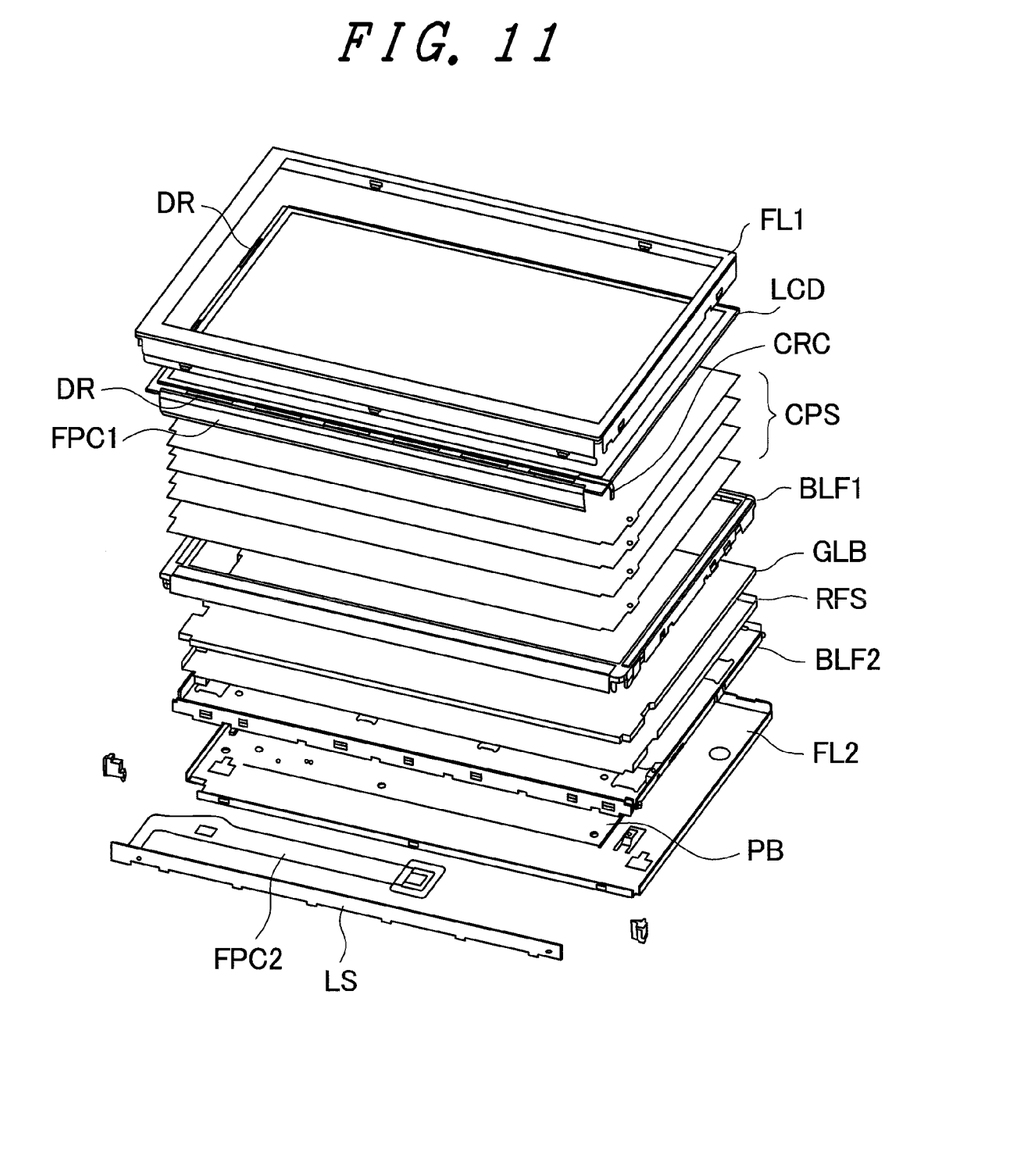
FIG. 11 is a developed perspective view for explaining one example of the whole constitution of the liquid crystal display device of the present invention.

FIG. 11 is a developed perspective view for explaining one example of the whole constitution of the liquid crystal display device according to the present invention. The backlight BL is configured such that a reflection sheet RFS, a light guide plate GLB, a light source LS, and an optical sheet group OPS constituted of a diffusion sheet, a prism sheet and the like are stacked on the backlight lower frame BLF2, and peripheries of these parts are held by the backlight upper frame BLF1 thus forming an integral body. The optical sheet OPS may be stacked on the backlight upper frame BLF1. Then, a liquid crystal panel LCD which includes drivers DR and to which a polarizer is adhered is mounted on the backlight BL, and a periphery of the liquid crystal panel LCD is covered with a metal-made upper frame FL1 from above. Symbol FPC1 indicates a flexible printed circuit board which supplies signals to the drivers DR (a scanning drive circuit, a data drive circuit), symbol PB indicates a display control circuit, and symbol FPC2 indicates a cable for supplying electricity to the light source or the like. On a back surface of the backlight lower frame BLF2, a printed circuit board BP which includes a liquid crystal drive circuit is arranged, and the printed circuit board is covered with a lower frame FL2.

In the above-mentioned respective embodiments 1 to 3, the conductive rubber cushion CRC is used as a conductive sheet, in the above-mentioned respective embodiments. However, it is not always necessary to impart the elasticity to the conductive sheet. Further, since the upper frame is not always necessary to have the conductivity and may not be made of metal. For example, the resin-made upper frame may be used. In this case, dots which may arise on a display of the liquid crystal panel due to the deformation of the resin-made upper frame can be eliminated.

Although the explanation has been made with respect to the side-edge-type backlight in which the light source is arranged on a surface of the side end portion of the light guide plate, the present invention is also applicable to a direct backlight in which a light source is arranged directly below the liquid crystal panel. Further, the light source may be formed of a CFL or an LED.

Embodiment 4

Figure 12:
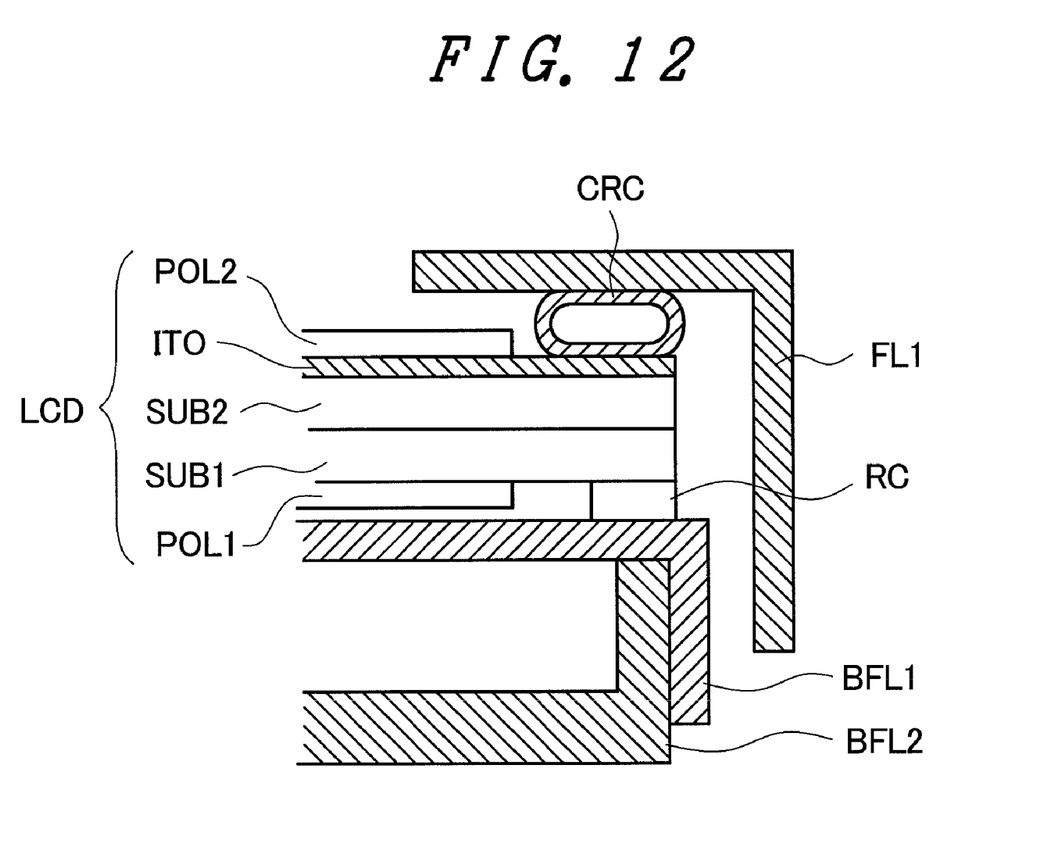
FIG. 12 is a cross-sectional view of an essential part for explaining an embodiment 4 of the liquid crystal display device of the present invention.

FIG. 12 is a cross-sectional view of an essential part for explaining the embodiment 4 of the liquid crystal display device according to the present invention. FIG. 13 is a cross-sectional view for explaining other constitutions of the conductive rubber usable in the liquid crystal display device of the present invention.

In this embodiment, the elasticity of a conductive member CRC is controlled. Further, in this embodiment, the explanation is made with respect to the case in which the conductive rubber cushion is used as the conductive member. The conductive rubber cushion CRC exhibits the excellent conductivity and the excellent formability and hence, the conductive rubber cushion is preferably used in the present invention.

That is, the liquid crystal display device of this embodiment includes a liquid crystal panel, a backlight assembly mounted on a back surface of the liquid crystal panel, and an upper frame which holds the liquid crystal panel and the backlight assembly while covering a periphery of a front surface of the liquid crystal panel and has a side wall extending toward the backlight. The liquid crystal panel includes a first substrate which forms thin film transistors on a main surface thereof, a second substrate which includes a light transmitting conductive layer on an outer surface thereof, and liquid crystal which is interposed between the first substrate and the second substrate. The light transmitting conductive layer of the second substrate and an inner surface of the upper frame (liquid-crystal-panel-side surface) are arranged to face each other in an opposed manner, and the inner surface of the upper frame and the light transmitting conductive layer are electrically connected with each other by way of the conductive rubber.

The conductive rubber has a cavity therein.

Further, a contact area of the conductive rubber with the light transmitting conductive layer and a contact area of the conductive rubber with the upper frame differ from each other. Here, the contact area between the conductive rubber and the light transmitting conductive layer and the contact area between the conductive rubber and the upper frame may be a direct contact or may be an indirect contact with a conductive adhesive material sandwiched therebetween.

The liquid crystal panel LCD has a first-substrate-side surface thereof fixed to the backlight upper frame BFL1 using a rubber cushion CRC to which an adhesive material is applied. On the other hand, a second-substrate-side surface of the liquid crystal panel is covered with a metal-made upper frame FL1 along an outer periphery of the liquid crystal panel. The upper frame FL1 includes a side wall which faces a side surface of the liquid crystal panel in an opposed manner and an eaves portion which extends in the direction substantially parallel to a front surface of the liquid crystal panel.

The conductive rubber cushion CRC is arranged in a state that the conductive rubber cushion CRC is brought into contact with a light transmitting conductive layer ITO formed on the second substrate. That is, the conductive rubber cushion CRC is sandwiched between the light transmitting conductive layer ITO formed on the CF substrate SUB2 and the upper frame. The conductive rubber cushion is fixed to an inner surface of the eaves portion of the upper frame using a conductive adhesive material. Further, the conductive rubber cushion may be arranged on the whole peripheral portion of the liquid crystal panel in a state that the conductive rubber cushion surrounds an image display region, and may be arranged on a part of the peripheral portion of the liquid crystal panel.

The conductive rubber cushion is formed into a sleeve shape having a space in the inside thereof. Although the conductive rubber cushion is sandwiched between the CF substrate SUB2 and the upper frame, a stress of a level which generates display dots is not applied to the liquid crystal panel.

FIG. 13A to FIG. 13E show modifications of the conductive rubber cushion in cross section.

Figure 13A:
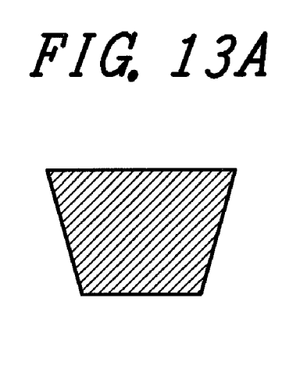
FIG. 13A to FIG. 13E are cross-sectional views of an essential part for explaining modifications of the embodiment 4.
Figure 13B:
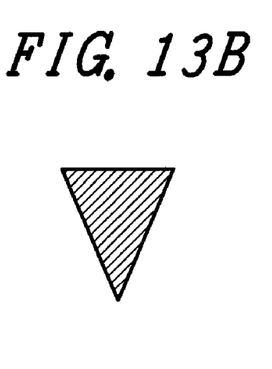
Figure 13C:
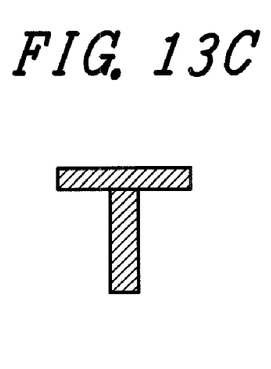

FIG. 13A shows the conductive rubber cushion having a trapezoidal cross section, FIG. 13B shows the conductive rubber cushion having a triangular cross section, FIG. 13C shows the conductive rubber cushion having a T-shaped cross section. These conductive rubber cushions are formed such that a panel-contact-side volume of the conductive rubber cushion is smaller than an upper-frame-contact-side volume of the conductive rubber cushion. Accordingly, the conductive rubber cushion is easily deformed at a portion thereof which is in contact with the liquid crystal panel. As a result, a stress is hardly applied to the liquid crystal panel thus preventing the generation of display dots on the liquid crystal panel.

Figure 13D:
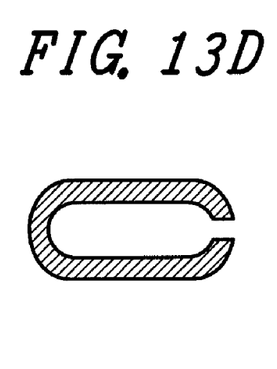
Figure 13E:
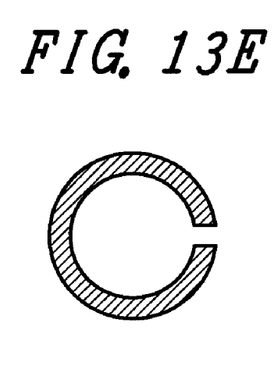

The conductive rubber cushion shown in FIG. 13D forms a planar surface portion at respective portions thereof which are in contact with the upper frame and the light transmitting conductive layer, forms a space in the inside thereof, and forms a hole in a portion thereof for allowing an inner space and an external space to be communicated with each other. FIG. 13E shows the conductive rubber cushion having a C-shaped cross section. In the conductive rubber cushions having the cross-sectional shapes shown in FIG. 13D and FIG. 13E, the hole which allows the inner space and the external space to be communicated with each other is formed and hence, it is possible to acquire the conduction between the light transmitting conductive layer and the upper frame without being influenced by a pressure in the inner space.

According to this embodiment, by controlling the elasticity of the conductive rubber cushion, it is possible to provide a liquid crystal display device which has a narrow picture frame and can suppress the generation of the display dots in the vicinity of the conductive rubber cushion.

What is claimed is:

1. A liquid crystal display device comprising:
a liquid crystal panel;
a backlight assembly mounted on a back surface of the liquid crystal panel; and
an upper frame which holds the liquid crystal panel while covering a periphery of a front surface of the liquid crystal panel and has a side wall extending toward a backlight side;
wherein the liquid crystal panel includes a first substrate which forms thin film transistors on a main surface thereof, a second substrate which forms a light transmitting conductive layer on an outer surface thereof, and liquid crystal which is interposed between the first substrate and the second substrate;
wherein the light transmitting conductive layer formed on the second substrate and an inner surface of the upper frame are arranged to face each other in an opposed manner, and the inner surface of the upper frame and the light transmitting conductive layer are electrically connected with each other using conductive rubber;
wherein the backlight assembly includes a backlight lower frame which has a first side wall extending toward a liquid crystal panel side, and a backlight upper frame which is arranged on the liquid crystal panel side, and which has a second side wall, wherein the backlight lower frame and the backlight upper frame are both comprised of a conductive material;
wherein an upper end portion of the backlight lower frame is arranged inside of the backlight upper frame; and
wherein the conductive rubber is sandwiched between the first side wall of the backlight lower frame and the second side wall of the backlight upper frame.

2. A liquid crystal display device comprising:
a liquid crystal panel;
a backlight assembly mounted on a back surface of the liquid crystal panel; and
an upper frame which holds the liquid crystal panel while covering a periphery of a front surface of the liquid crystal panel and has a side wall extending toward a backlight side;
wherein the liquid crystal panel includes a first substrate which forms thin film transistors on a main surface thereof, a second substrate which forms a light transmitting conductive layer on an outer surface thereof, and liquid crystal which is interposed between the first substrate and the second substrate;
wherein the light transmitting conductive layer formed on the second substrate and an inner surface of the upper frame are arranged to face each other in an opposed manner, and the inner surface of the upper frame and the light transmitting conductive layer are electrically connected with each other using conductive rubber;
wherein a contact area of the conductive rubber with the light transmitting conductive layer and a contact area of the conductive rubber with the upper frame differ from each other;
wherein the backlight assembly includes a backlight lower frame which has a first side wall extending toward a liquid crystal panel side, and a backlight upper frame which is arranged on a liquid crystal panel side, and which has a second side wall, wherein the backlight lower frame and the backlight upper frame are both comprised of a conductive material;

wherein an upper end portion of the backlight lower frame is arranged inside the backlight upper frame; and wherein the conductive rubber is sandwiched between the first side wall of the backlight lower frame and the second side wall of the backlight upper frame.

3. A liquid crystal display device according to claim 1, wherein the conductive rubber electrically connects the backlight upper frame and the backlight lower frame.

4. A liquid crystal display device according to claim 2, wherein the conductive rubber electrically connects the backlight upper frame and the backlight lower frame.

5. A liquid crystal display device according to claim 1, wherein the upper end of the backlight lower frame is arranged so that the first side wall of the backlight lower frame faces the second side wall of the backlight upper frame.

6. A liquid crystal display device according to claim 5, wherein the upper end of the backlight lower frame is arranged so that the first side wall of the backlight lower frame faces the second side wall of the backlight upper frame.

7. A liquid crystal display device according to claim 1, wherein said conductive material comprises metal.

8. A liquid crystal display device according to claim 2, wherein said conductive material comprises metal.

9. A liquid crystal display device according to claim 5, wherein said conductive material comprises metal.

10. A liquid crystal display device according to claim 6, wherein said conductive material comprises metal.

* * * * *